(12) United States Patent
Kulkarni et al.

(10) Patent No.: US 11,454,072 B2
(45) Date of Patent: Sep. 27, 2022

(54) DOWNHOLE KICK DETECTION BASED ON POWER MONITORING OF SHALE SHAKER(S)

(71) Applicant: Halliburton Energy Services, Inc., Houston, TX (US)

(72) Inventors: Abhijit Kulkarni, Pune (IN); Gillies Alexander MacDonald, Aberdeenshire (GB); Prashant Shekhar, Houston, TX (US); Brian Scott Cooper, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/957,563

(22) PCT Filed: Mar. 25, 2019

(86) PCT No.: PCT/US2019/023930
§ 371 (c)(1),
(2) Date: Jun. 24, 2020

(87) PCT Pub. No.: WO2019/191004
PCT Pub. Date: Oct. 3, 2019

(65) Prior Publication Data
US 2020/0332642 A1      Oct. 22, 2020

Related U.S. Application Data

(60) Provisional application No. 62/650,352, filed on Mar. 30, 2018.

(51) Int. Cl.
*E21B 21/06*     (2006.01)
*E21B 44/00*    (2006.01)
*G01V 9/00*     (2006.01)

(52) U.S. Cl.
CPC ............ *E21B 21/065* (2013.01); *E21B 44/00* (2013.01); *G01V 9/00* (2013.01)

(58) Field of Classification Search
CPC ....... E21B 21/06; E21B 21/063; E21B 21/065
See application file for complete search history.

(56) References Cited

U.S. PATENT DOCUMENTS

| 4,809,791 A | 3/1989 | Hayatdavoudi |
| 2013/0220600 A1 | 8/2013 | Bakri et al. |

(Continued)

FOREIGN PATENT DOCUMENTS

| WO | 2016077521 A1 | 5/2016 |
| WO | 2019160859 A1 | 8/2019 |

OTHER PUBLICATIONS

PCT Application Serial No. PCT/US2019/023930, International Search Report, dated Aug. 2, 2019, 3 pages.

(Continued)

*Primary Examiner* — Kristyn A Hall
(74) *Attorney, Agent, or Firm* — Delizio, Peacock, Lewin & Guerra

(57) ABSTRACT

A method includes performing a downhole operation in a borehole in a formation. Downhole particles and drilling mud are captured at a surface from the borehole into a screen of a shaker during the downhole operation. Input power that comprises at least one of voltage, current, and leakage current being supplied to the shaker is monitored during operation of the shaker, it is determined whether the input power exceeds a threshold as a result of change in a load on the shaker. In response to determining that the input power exceeds the threshold as the result of change in the load on the shaker, it is determined that there is a kick condition in (Continued)

the borehole, where the kick condition comprises a condition in which a pressure of the formation exceeds a pressure in the borehole.

17 Claims, 8 Drawing Sheets

(56) References Cited

U.S. PATENT DOCUMENTS

| | | |
|---|---|---|
| 2017/0037691 A1 | 2/2017 | Savage et al. |
| 2017/0089153 A1 | 3/2017 | Teodorescu |

OTHER PUBLICATIONS

PCT Application Serial No. PCT/US2019/023930, Written Opinion, dated Aug. 2, 2019, 7 pages.

DOWNHOLE KICK DETECTION BASED ON POWER MONITORING OF SHALE SHAKER(S)

TECHNICAL FIELD

The disclosure generally relates to the field of hydrocarbon recovery, and more particularly to kick detection during hydrocarbon recovery operations.

BACKGROUND ART

During drilling operations, kick can be one of the largest threats. A kick occurs when formation pressure exceeds the drilling fluid hydrostatic pressure acting on a borehole, which allows formation contents such as gases, fluids, etc, to enter the borehole. Factors which influence the potential and severity of a kick include qualities of the formation (e.g., rock permeability or porosity) and the pressure differential between the formation pressure and the borehole hydrostatic pressure. Failure to detect and control kicks can lead to a blowout.

BRIEF DESCRIPTION OF THE DRAWINGS

Embodiments of the disclosure may be better understood by referencing the accompanying drawings.

DESCRIPTION OF EMBODIMENTS

Figure 1:
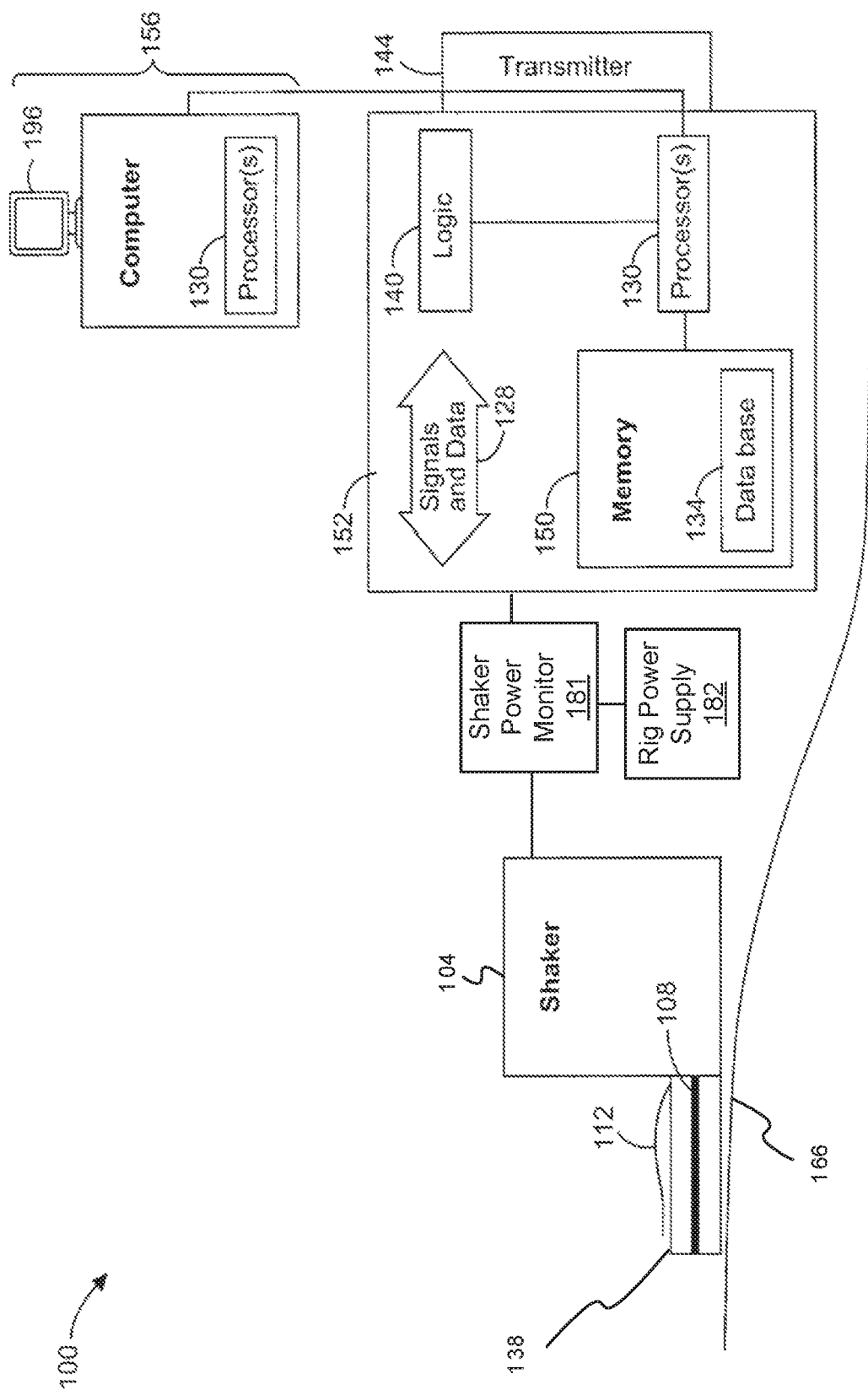
FIG. 1 is a block diagram of an example shaker system with power monitoring for processing of downhole particles, according to some embodiments.

The description that follows includes example systems, methods, techniques, and program flows that embody aspects of the disclosure. However, it is understood that this disclosure may be practiced without these specific details. For instance, this disclosure refers to drilling and fracturing operations for kick detection. Aspects of this disclosure can be also applied to any other applications for downhole operations that return downhole particles to the surface. In other instances, well-known instruction instances, structures and techniques have not been shown in detail in order not to obfuscate the description.

Various embodiments relate to kick detection in a borehole based on power monitoring of a shaker used for processing cuttings at the surface received from downhole. A kick can be defined as occurring when a pressure of a surrounding formation exceeds a pressure in the borehole, allowing formation contents such as gases, fluids, etc. to enter the borehole. In particular, various embodiments relate to downhole operations in a borehole in which particles are returned to the Earth's surface. For example, the particles can be drill cuttings returning to the surface from downhole during drilling of the borehole. In another example, the particles can be the proppants and any other particles (e.g., portions of the formation) that return to the surface during or after hydraulic fracturing operations. At the surface, drilling fluid (also referred to in the art as "drilling mud"), cuttings, and any other particles are placed into a shaker to separate solids from the drilling fluid.

Some embodiments can include identifying a kick as occurring downhole based on various indicators. The indicators can be classified as possible indicators and positive indicators. In some embodiments, power monitoring of the shaker can be a positive indicator if power consumed by the shaker exceeds a baseline threshold. Other examples of positive indicators of a kick include an increase in return flow, increase in level of drilling fluid in a mud pit, continued fluid flow while the pumps are inactive, trip log deviation during tripping in or out, and positive flow in the trip tank when the drill pipe is static during tripping. Examples of possible indicators of a kick include an increased rate of penetration, increase in drag and torque, decrease in shale density, increase in cutting size and shape, change in mud property, increase in temperature from returning mud, increase in trip gas, connection gas, and/or background gas, and decrease in d-exponent value.

Accordingly, a determination of whether a kick occurred can be based on these various indicators. Utilizing tools and applications that have kick indicators for both possible and positive kicks facilitates kick detection. Additionally, these kick indicators can facilitate determination of subsequent mitigating actions which should be taken. Increasing the number of positive indicators for kicks increases the level of certainty that a kick is occurring. A greater confidence of the indicators also facilitates well management while encountering kick conditions. Accordingly, various embodiments provide an additional positive indicator that is based on whether the power being consumed by motor(s) of shaker(s) exceeds a baseline threshold.

Example Shaker System With Power Monitoring

FIG. 1 is a block diagram of an example shaker system with power monitoring for processing of downhole particles, according to some embodiments. In some embodiments, a system 100 includes one or more processors 130. The system 100 may also include logic 140, perhaps comprising a programmable data acquisition subsystem.

A memory 150 can be used to store acquired image data, as well as other data (e.g., perhaps in a database 134). The memory 150 is communicatively coupled to the processor(s) 130. The memory 150 and/or the processor(s) 130 may be located above a surface 166 of a geological formation, perhaps forming part of a data acquisition system 152. In some embodiments, any of the components depicted in FIG. 1 may be located below the surface 166.

A shaker 104 and possibly any other components at the wellsite is powered by a rig power supply 182. While only depicting one shaker, the system 100 can include any number of shakers. The system 100 can include different types of shakers, such as unbalanced elliptical motion shakers, circular motion shakers, linear motion shakers, balanced elliptical motion shakers, etc. Additionally, each shaker can include one or more motors to provide the vibration to the shaker 104 to allow for separation of solids and liquid 112 (e.g., downhole particles and drilling fluid, hereinafter referred to as "cuttings 112") deposited on the shaker 104, such as on a drilling mud screen 108. The type of motions imparted to the shaker 104 depends on the location, orientation and number of motors used. As shown, the rig power supply 182 is coupled to a shaker power monitor 181, which is coupled to the shaker 104. The rig power supply 182 supplies power to motor(s) of the shaker 104 through the shaker power monitor 181.

The drilling mud screen 108 may form part of a shaker deck, such as a shale shaker deck. Thus, the drilling mud screen 108 may be included in a shaker deck 138.

The shaker power monitor 181 is also coupled to the data acquisition system 152. The shaker power monitor 181 can input data regarding power usage by the shaker 104 to the data acquisition system 152. The logic 140 can process the data from the power monitor to determine power usage by the shaker 104. The logic 140 can also determine if power usage by the shaker 104 exceeds a baseline threshold.

For longer data transmission distances, and to reduce the magnitude of possible interference, information 128 may be converted to an optical format and sent to a workstation 156 via fiber optic transmission. A transmitter 144 may be used to send the information 128 or a processed form of the information 128 to the workstation 156 via wires, fiber optics, or wirelessly. The workstation 156 can comprise a display 196 to display changes in input power supplied to the shaker 104 via a graphical user interface ("GUI"). The workstation 156 may be onsite or offsite.

Though not depicted in FIG. 1 returning drilling fluid travels from a flow line to the shaker 104 via a header box and gumbo box attached to the shaker 104. The mud is placed on the shaker 104 where the solids (e.g., cuttings) 112 are separated out and the drilling fluid is filtered out. The filtered drilling fluid is collected in settling pits, typically located adjacent to or below the drilling mud screen 108. The settling pit facilitates separation of coarser solids that bypass the shaker 104. Mud enters the pit at one side and exits via an overflow at the other. The mud is collected in one or more mud pits (the "active pits") after the solids have been removed in the settling pit and/or desander(s) and desilter(s). The mud level can be actively monitored in the active pits. Increase in mud level in the active pits is considered as a positive indicator of kick detection. However, the time taken to detect the increase in mud level can result in a delay in detection of possible kick conditions. Analysis of the load of drilling fluid and cuttings (or "fluid load") on the shaker 104 occurs upstream with respect to the active pit and facilitates advanced detection of possible kick conditions occurring downhole.

Figure 3:
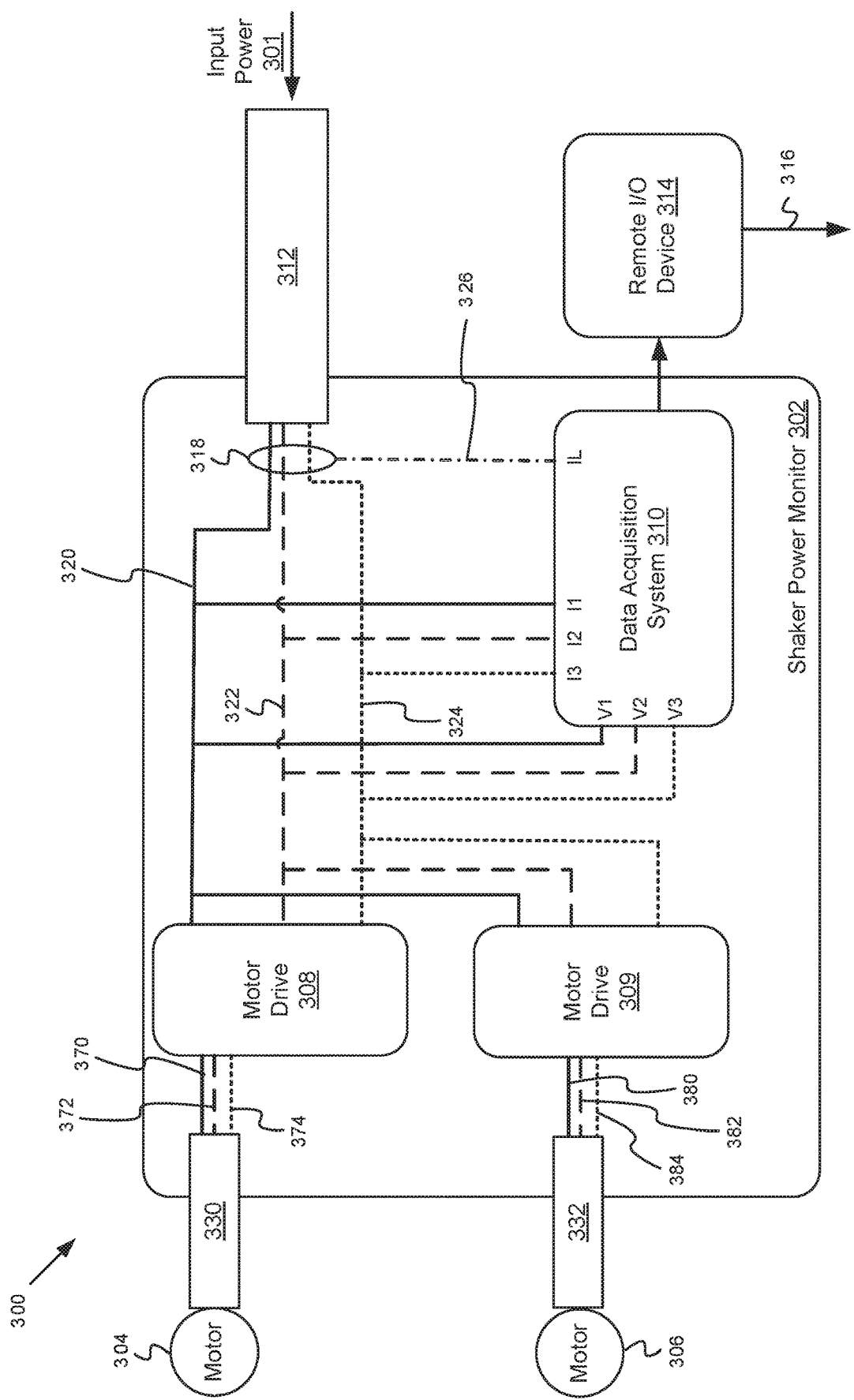
FIG. 3 is a more detailed block diagram of a power monitoring system of a shale shaker, according to some other embodiments.
Figure 4:
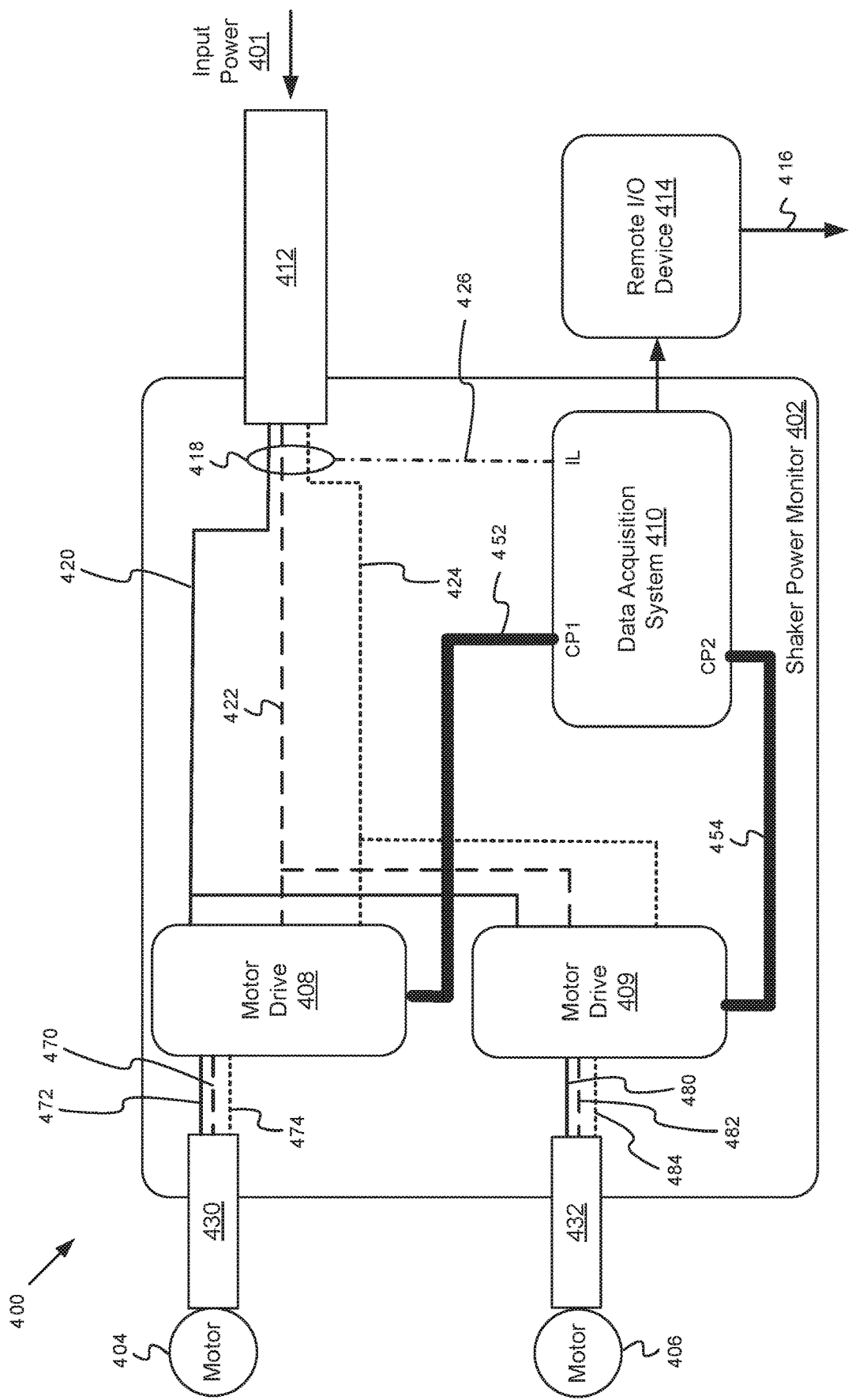
FIG. 4 is a more detailed block diagram of a power monitoring system of a shale shaker, according to some other embodiments.

A correlation can be defined between the totalized drilling fluid flow volume and power consumed by the motors of the shaker 104 described below with reference to FIGS. 2-4. Because power consumption of the shaker 104 is correlated to the drilling fluid load on the shaker 104, the load on the motors can be determined by monitoring the power fed to the motors. Depending on the expected volume of return flow, the flow is distributed across the shakers (i.e., if the system 100 includes shakers in addition to the shaker 104). The shaker 104 should be operated at a particular G-factor and rotations per minute (RPM) (e.g., rotation speeds of 1800 RPM for 60 Hertz (Hz) applications and 1500 RPM for 50 Hz applications). Higher volumes of drilling fluid inflow can cause an increase in power consumption in order to maintain the G-factor and RPM on the motors. Slower RPM reduces the G-factor and may cause poor solids separation and poor conveyance. Faster RPM increases the G-factor and may improve the conveyance and separation. However, faster RPM can harm the shaker 104 and increase failures due to drilling mud screen 108 fatigue.

By utilizing the correlation between the power consumption by the motors of the shaker 104 and the fluid load on the shaker 104 (or each shaker, if more than one shaker), sudden increases in power consumption trends can be captured for each of the motors. Total power consumption can be correlated to the total drilling fluid inflow on some of the shakers or each shaker included in the system 100 as further described below with reference to FIG. 7. An alarm condition can be defined when the observed power consumption is out of normal operating range or exceeds a baseline threshold. Using this data, a positive kick indicator can thus be added to an early warning system for kick detection.

Example Systems for Power Monitoring of a Shaker

Figure 2:
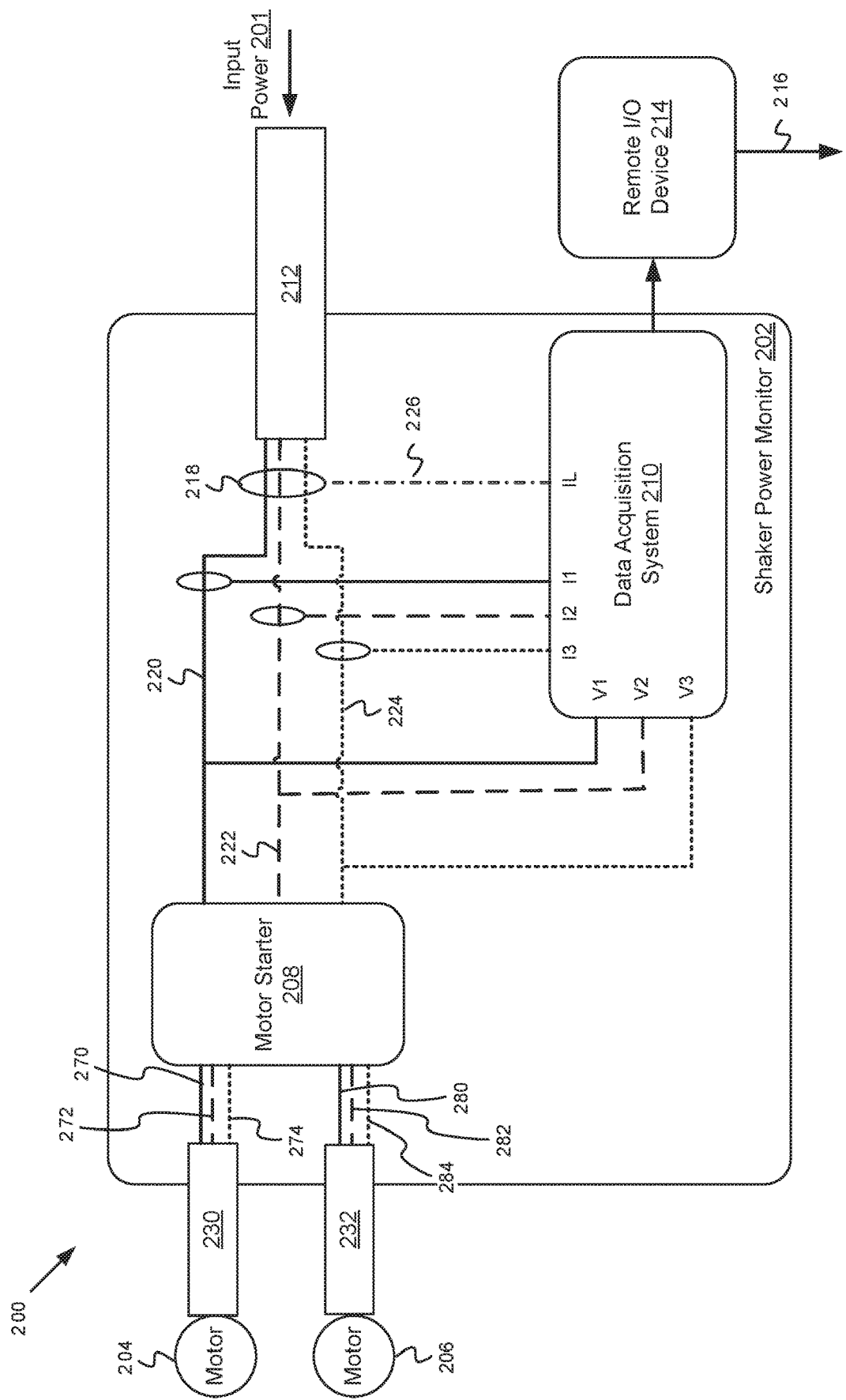
FIG. 2 is a more detailed block diagram of a power monitoring system of a shale shaker, according to some embodiments.

FIG. 2 is a block diagram of an example system for monitoring power of a shaker, according to some embodiments. A system 200 includes a shaker power monitor 202 having a data acquisition system 210 and a motor starter 208. The shaker power monitor 202 can be an example of the shaker power monitor 181 depicted in FIG. 1. The shaker power monitor 202 receives an input power 201 that is supplied by rig power. For example, with reference to FIG. 1, the rig power supply 182 can supply the input power 201. In some embodiments, the input power 201 is three-phase being input via three conductors, wherein each conductor carries an alternating current relative to a common reference but with a phase difference of one third period. In some other embodiments, the input power 201 can be other types of power, such as two-wire single phase power.

A conductor 220 and 270 are carrying an alternating current at a first phase. A conductor 222 and 272 are carrying an alternating current at a second phase. A conductor 224 and 274 are carrying an alternating current at a third phase. The input power 201 is supplied to the shaker power monitor 202 through a power cable 212. The power cable 212 includes the conductor 220, the conductor 222, and the conductor 224.

The conductor 220 is coupled to a first input of the motor starter 208 as well as an input I1 (current for phase 1) and an input V1 (voltage for phase 1) of the data acquisition system 210. The conductor 222 is coupled to a second input of the motor starter 208 as well as an input I2 (current for phase 2) and an input V2 (voltage for phase 2) of the data acquisition system 210. The conductor 224 is coupled to a third input of the motor started 208 as well as input V3 (voltage measurement of phase 3) and an input I3 (current measurement for phase 3) of the data acquisition system 210. Also, a conductor 226 is coupled to each of the conductors 220, 222, and 224 via a transformer(s) 218 to supply leakage current to an input IL (input leakage). As further described below, the data acquisition system 210 can monitor the voltages and currents for each of the three phases along with the leakage current to determine whether a baseline threshold of power is being exceeded.

A first output of the motor starter 208 is coupled, via a power cable 230 that includes the conductors 270-274, to a motor 204. A second output of the motor starter 208 is coupled, via a power cable 232 that includes the conductors 280-284, to a motor 206. With reference to FIG. 1, the motors 204 and 206 can be motors of the shaker 104. While depicted with two motors, each shaker can include any number of motors. Also, there can be any number of shakers, wherein each shaker includes an associated shaker power monitor.

Another example of the shaker power monitor 181 in FIG. 1 is now described. In particular, FIG. 3 is a block diagram of an example system for monitoring power of a shaker, according to some other embodiments. A system 300 is similar to the system 200 of FIG. 2, but the system 300 includes motor drives 308 and 309 for motors 304 and 306, respectively. A shaker power monitor 302 includes a data acquisition system 310 and the motor drives 308 and 309. The shaker power monitor 302 receives an input power 301 that is supplied by rig power. For example, with reference to FIG. 1, the rig power supply 182 can supply the input power 301. In some embodiments, the input power 301 is three-phase power being input via three conductors, wherein each conductor carries an alternating current relative to a common reference but with a phase difference of one third period. In some other embodiments, the input power 301 can be other types of power, such as two-wire single phase power.

A conductor 320 carries an alternating current at a first phase. A conductor 322 carries an alternating current at a second phase. A conductor 324 carries an alternating current at a third phase. The input power 301 is supplied to the shaker power monitor 302 through a power cable 312. The power cable 312 includes the conductor 320, the conductor 322, and the conductor 324.

The conductor 320 is coupled to a first input of the motor drives 308 and 309 as well as input V1 (voltage measurement of phase 1) and an input I1 (current measurement for phase 1) of the data acquisition system 310. The conductor 322 is coupled to a second input of the motor drives 308 and 309 as well as input V2 (voltage measurement of phase 2) and an input I2 (current measurement for phase 2) of the data acquisition system 310. The conductor 324 is coupled to a third input of the motor drives 308 and 309 as well as input V3 (voltage measurement of phase 3) and an input I3 (current measurement for phase 3) of the data acquisition system 310. Also, the conductor 326 is coupled to current measurements of the conductors 320, 322, and 324 via a transformer(s) 318 to measure leakage current (system leakage) and to supply current to an input IL (input leakage).

The motor drive 308 is connected to motor 304 through a power cable 330. The power cable 330 includes the conductor 370, the conductor 372, and the conductor 374. A first output of the motor drive 308 is coupled, via the conductor 370, to a first input of the motor 304. A second output of the motor drive 308 is coupled, via the conductor 372, to a second input of the motor 304. A third output of the motor drive 308 is coupled, via the conductor 374, to a third input of the motor 304. The motor drive 309 is connected to motor 306 through a power cable 332. The power cable 332 includes the conductor 380, the conductor 382 and the conductor 384. A first output of the motor drive 309 is coupled, via the conductor 380, to a first input of the motor 306. A second output of the motor drive 309 is coupled, via the conductor 382, to a second input of the motor 306. A third output of the motor drive 309 is coupled, via the conductor 384, to a third input of the motor 306. As further described below, the data acquisition system 310 can monitor the voltages and currents for each of the three phases along with the leakage current to determine a baseline minimum and maximum threshold of power for the associated shaker and to determine whether the baseline threshold of power is being exceeded.

Another example of the shaker power monitor 181 in FIG. 1 is now described. In particular, FIG. 4 is a block diagram of an example system for monitoring power of a shaker, according to some other embodiments. A system 400 is similar to the system 200 of FIG. 2, but includes motor drives 408 and 409 for motors 404 and 406, respectively. A shaker power monitor 402 includes a data acquisition system 410 and the motor drives 408 and 409. The shaker power monitor 402 receives an input power 401 that is supplied by rig power. For example, with reference to FIG. 1, the rig power supply 182 can supply the input power 401. In some embodiments, the input power 401 is three-phase power being input via three conductors, wherein each conductor carries an alternating current relative to a common reference, but with a phase difference of one third period. In some other embodiments, the input power 401 can be other types of power, such as two-wire single phase power.

A conductor 420 carries an alternating current at a first phase. A conductor 422 carries an alternating current at a second phase. A conductor 424 carries an alternating current at a third phase. The input power 401 is supplied to the shaker power monitor 402 through a power cable 412. The power cable 412 includes the conductor 420, the conductor 422, and the conductor 424.

The conductor 420 is coupled to a first input of the motor drive 408 and first input of motor drive 409. The conductor 422 is coupled to a second input of the motor drive 408 and second input of motor drive 409. The conductor 424 is coupled to a third input of the motor drive 408 and third input of motor drive 409. The conductor 426 is coupled to current measurement of the conductors 420, 422, and 424 via a transformer(s) 418 to supply leakage current to an input IL to measure current leakage. The communication cable 452 is coupled from motor drive 408 to the communication port CP1 of the data acquisition system 410, which transfers the power data to the data acquisition system 410. This power data includes the voltage on conductor 470, voltage on conductor 472, voltage on conductor 474 as well current flowing through conductor 470, current flowing through conductor 472, and current flowing through conductor 474. The communication cable 454 is coupled from motor drive 409 to the communication port CP2 of the data acquisition system 410 which transfers the power data to the data acquisition system 410. This power data includes the voltage on conductor 480, voltage on conductor 482, voltage on conductor 484 as well current flowing through conductor 480, current flowing through conductor 482, and current flowing through conductor 484. The communication cable 452 and 454 can be any cable which can suite any standard communication protocol being used by motor drive 408 and motor drive 409, which can be Profibus DP, Modbus RTU over RS485, Profinet, Modbus TCP over Ethernet or any communication protocol which can be used on any type of physical communication layer, such as RS232, RS485, Ethernet etc.

Changes in power consumption by the motors 204 and/or 206, 304 and/or 306, and 404 and/or 406 (hereinafter "the motors") of the shaker(s) (e.g., the shaker 104) can change due to one or more of conditions. A first condition can be a change in the total fluid load on the shaker(s). A second condition can be erratic vibration of the shaker(s) due to mechanical wear on the shaker(s). A third condition can be variation in the input power to the rig (e.g., via the rig power supply 182). A fourth condition can be an increase or change in ground leakage current due to due to degradation or minor damages to the motors. Accordingly, to monitor totalized fluid volume correctly on the shaker(s), corrections can be first applied for the variations in rig power, ground faults, and erratic vibration.

One or more vibration sensors can be mounted on the shaker(s) to capture the vibration trend of the shaker(s) in three axes (i.e., in an X-direction, a Y-direction, and a Z-direction), as further described below in reference to FIG. 5. As the fluid load changes on the shaker(s), the vibration may change briefly before stabilizing. This brief variation in vibration Indicates a varying drilling fluid load condition. However, drifting of the vibration trend from the normal operating range can indicate shaker(s) malfunction in a form of mechanical wear, torn rubber mounts, improper shaker screen tension (e.g. in the drilling mud screen 108 in FIG. 1), broken hardware, etc. Accordingly, erratic vibration can be taken into account to establish correlation between total fluid load change and power feed changes.

The data acquisition systems 210, 310, and/or 410 (hereinafter the "data acquisition systems") can capture the power supplied to the shaker(s). For instance, as further described with reference to FIG. 7, the data acquisition systems can calculate the power supplied to the shaker(s) at a given point in time. Any power fluctuations in the input power 201, 301, or 401 to the rig power supply 182 can be captured by the data acquisition systems. Differentiation can be made to indicate the differences between changes in power feed due to change in total fluid load on the shaker(s) versus changes in power caused by abnormalities in power quality being supplied to the rig (e.g., "dirty" power). Accordingly, power fluctuations can also be accounted for to establish correlation between total fluid load change and power feed changes.

The data acquisition systems can also capture the leakages due to a ground fault (i.e., the leakage current supplied to the input IL). Leakages or ground faults may cause an increase in current flow relative to when there is no leakage or ground faults. Accordingly, leakage or ground faults can be accounted for by adjusting the calculated power to deduct the measured current leakage to establish the correlation between total fluid load change and power feed changes.

The shaker power monitors 202, 302, and/or 402 (hereinafter the "shaker power monitors") may be certified for Zone 1 and Class 1, Division 1 hazardous location installations. Current sensors of the shaker power monitors can be connected with a power line before the power line is fed to the shaker motor(s). Because the shaker(s) can receive input power beyond the intrinsic safe limit (e.g., via input power 201, 301, and 401 in FIGS. 2-4), components of the shaker power monitors should be mounted in an explosion-proof ("Ex d") box to maintain a Zone 1 hazardous location classification. Output of the data acquisition systems can be amplified and connected to remote input/output (I/O) devices 214, 314, and 414 (hereinafter "remote I/O devices") through armored or unarmored intrinsically safe cables. The output can be digital or analog. The remote I/O devices can be coupled to a computer or other device through intrinsically safe barriers or remote I/O systems placed in a Zone 1 atmosphere. Alternatively, the remote I/O devices can be an external data acquisition system with intrinsically safe barriers. To minimize the multiple cable runs, fiber/copper cable can run from the Zone 1 certified remote I/O devices to a safe area (e.g., a mud logging unit). The remote I/O devices can be connected to a network computer and database (e.g., the workstation 156 and its components in FIG. 1), where the data can be recorded in real time. A GUI can be created to plot power trends on a display (e.g., the display 196 in FIG. 1), such as trends in measured voltage or current, calculated power, and/or power factor.

During normal operation of the system 100 (i.e., steady fluid load on and power consumption of the shakers), the input power trend will be baselined. The baseline can be leveraged for consistent power monitoring of the shaker 104. The baseline can be recaptured periodically to account for windings of the motors and/or performance degradation or any other minor faults in motor windings. If the system 100 includes multiple shakers, the baseline is established for the system 100. For example, a baseline for the system 100 which includes the shaker 104 may be 1.0 kilowatts (kW). A baseline for the system 100 which includes three shakers may be 2.5 kW. The determination of whether the power consumption deviates from the baseline therefore considers whether the sum of the power consumption across the three shakers substantially deviates from the 2.5 kW baseline. The baseline and/or monitored trends in input power to each shaker may be displayed on a GUI, such as via the display 196. Substantial deviations from the baseline result in an alert condition. Alert conditions can occur for the shaker(s) due to sudden or gradual increase in mud flow, sudden or gradual decrease in mud flow, damage of the shaker dampener, damage on the motors, power failure, etc., and can be displayed via the GUI.

Example System for Processing Shaker Vibrations

Figure 5:
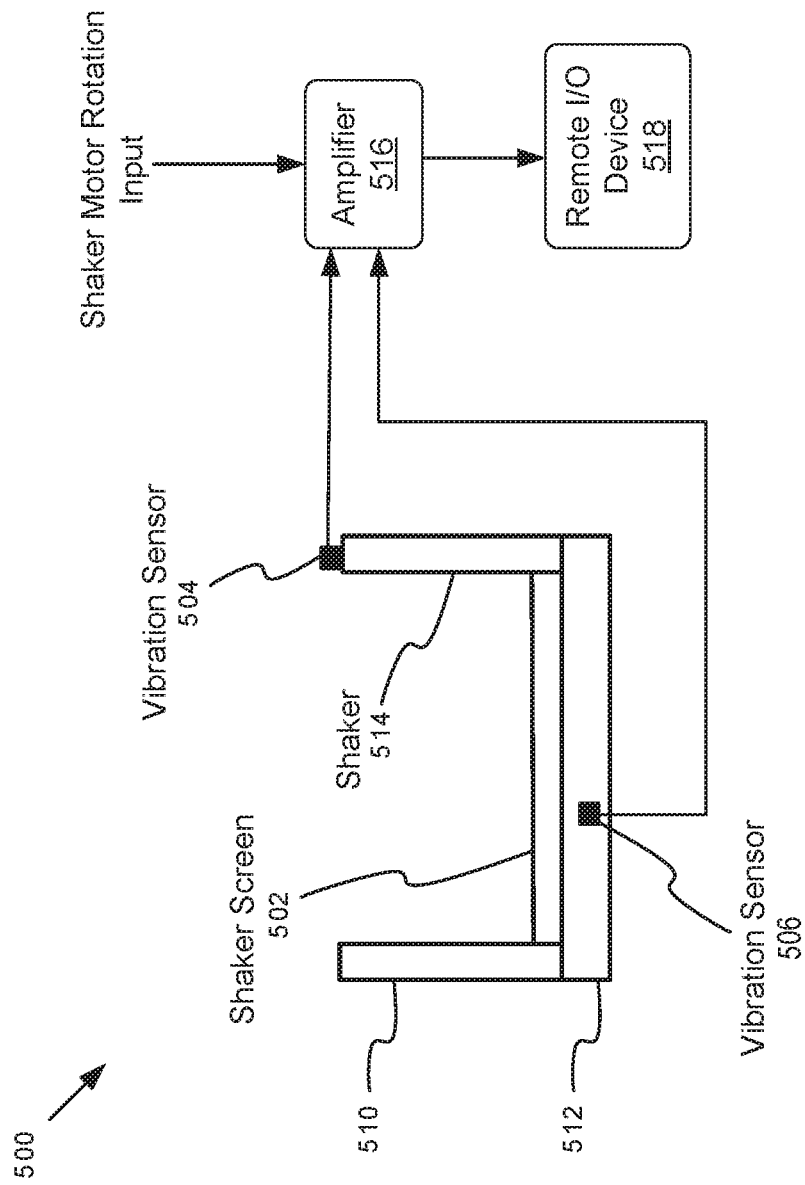
FIG. 5 is a block diagram of an example system for processing and analyzing vibrations of the shaker and measurement cuttings in the shaker, according to some embodiments.

FIG. 5 is a block diagram of an example system for processing and analyzing vibrations of the shaker and measurement cuttings in the shaker, according to some embodiments. Shakers are part of the solids control system on a drilling rig and can be used to remove large solids (e.g., cuttings) from the drilling fluid returning to the surface from downhole. Examples of shakers can include a linear shaker, a circular shaker, and a general elliptical shaker.

FIG. 5 depicts a system 500 that includes a shaker screen 502 (similar to the drilling mud screen 108 of FIG. 1) on which cuttings and drilling fluid are placed after returning to the surface for separation of the cuttings from the drilling fluid. The system also includes shakers 510-514 (similar to the shaker 104 in FIG. 1) that are coupled to the shaker screen 502. The shakers 510-514 cause the shaker screen 502 to vibrate to assist in the separation of the cuttings from the drilling fluid. In this example, the shaker 510 is positioned to the left of and approximately perpendicular to the shaker screen 502. The shaker 514 is positioned to the right of and approximately perpendicular to the shaker screen 502. The shaker 512 is positioned below and approximately parallel to the shaker screen 502. The shakers 510-514 can vibrate together or independent of each other. The system 500 also includes vibration sensors 504 and 506. In this example, the vibration sensor 504 is positioned on the shaker 514, and the vibration sensor 506 is positioned on the shaker 512. More or fewer vibrations sensors can be positioned on other locations on the same and/or different shakers.

The system 500 also includes an amplifier 516 coupled to the vibration sensors 504-506. The amplifier 516 can receive the level of vibration from each of the vibration sensors 504-506. The amplifier 516 can also be coupled to receive shaker motor rotation input. For example, the shaker motor rotation input can be number of rotations per unit of time for one or more motors used to vibrate the shakers. The amplifier 516 can amplify this data prior to its transmission to a remote I/O device 518. For example, the remote I/O device 518 can be remote from the well site where the downhole operations are occurring. The remote I/O device 518 can be coupled to a computer or other device for processing the data (e.g., the workstation 156 in FIG. 1). The remote I/O device 518 can be connected to a network computer and database, where the data can be recorded real time. GUIs can also be created to plot the vibration trends. Some embodiments can be certified for Zone 1/Class 1/Division 1 hazardous location installations as similarly described in reference to FIGS. 2-4. The vibration sensors 504 and 506 can be connected to the remote I/O device 518 through intrinsically safe cables (armored or unarmored) via a universal intrinsic safe transmitter/amplifier, such as the amplifier 516. To minimize multiple cable runs, fiber or copper cable can run from the Zone 1 certified remote I/O device 518 to a safe area (e.g., mud logging unit).

When the shakers 510-514 are performing per the specification (i.e., steady fluid load on and power consumption of the shakers 510-514), the vibration trend can be baselined. Utilizing this baseline, the trend can be captured for a consistent monitoring of the shaker. Under fault conditions, vibration trends will deviate from the normal operating trends. Fault conditions can occur on the shakers 510-514 due to various scenarios (e.g., broken or torn rubber mounts, unbalanced motors that are working in the opposite direction, mechanical faults, damaged screens, damaged springs, improper installation of screens, etc.). Any deviation from the normal vibration trend can prompt output of alerts or notifications using alarms, signals, etc. Erratic vibration due to mechanical wear or mechanical error may also contribute to an increase in input power supplied to motors of the shakers 510-514. When an increase in input power is detected, it can be checked whether the increase in input power is attributable to erratic vibration of the shakers 510-514.

Observed vibration trends can be compared to a vibration fault threshold to determine whether the shakers 510-514 are vibrating erratically. The vibration fault threshold can be set based on the vibration limit for a normal operating condition of the shakers 510-514. The vibration fault threshold can be based on the type of motors in the shakers 510-514, the type of shaker screen 502, the type of cuttings, the type of drilling fluid, etc. Additionally, if there are multiple vibration sensors, each sensor can have its own vibrations fault threshold. For example, the vibration sensors 504 and 506 can each have distinct vibrations fault thresholds. In some embodiments, if the vibrations fault threshold for any of the vibration sensors is exceeded, the vibrations can be determined to be in excess of the vibrations fault threshold. In some other embodiments, the vibrations can be determined to be in excess of the vibrations fault threshold if vibrations measured for each of the vibration sensors are exceeded. In some other examples for a multiple vibration sensor configuration, such as in the system 500, values of the vibrations from the different vibration sensors can be combined (e.g., averaged). In such situations, the combined value can be compared to a vibrations fault threshold. If the measured vibration exceeds the vibrations fault threshold, it is determined that a fault condition has occurred for the shaker(s). Upon both observing an increase in input power and detecting a fault condition for the one or more of the shakers 510-514, it can be determined that the increase in input power is a result of the erratic vibration of the shaker(s) 510-514.

Example Drilling Application

Figure 6:
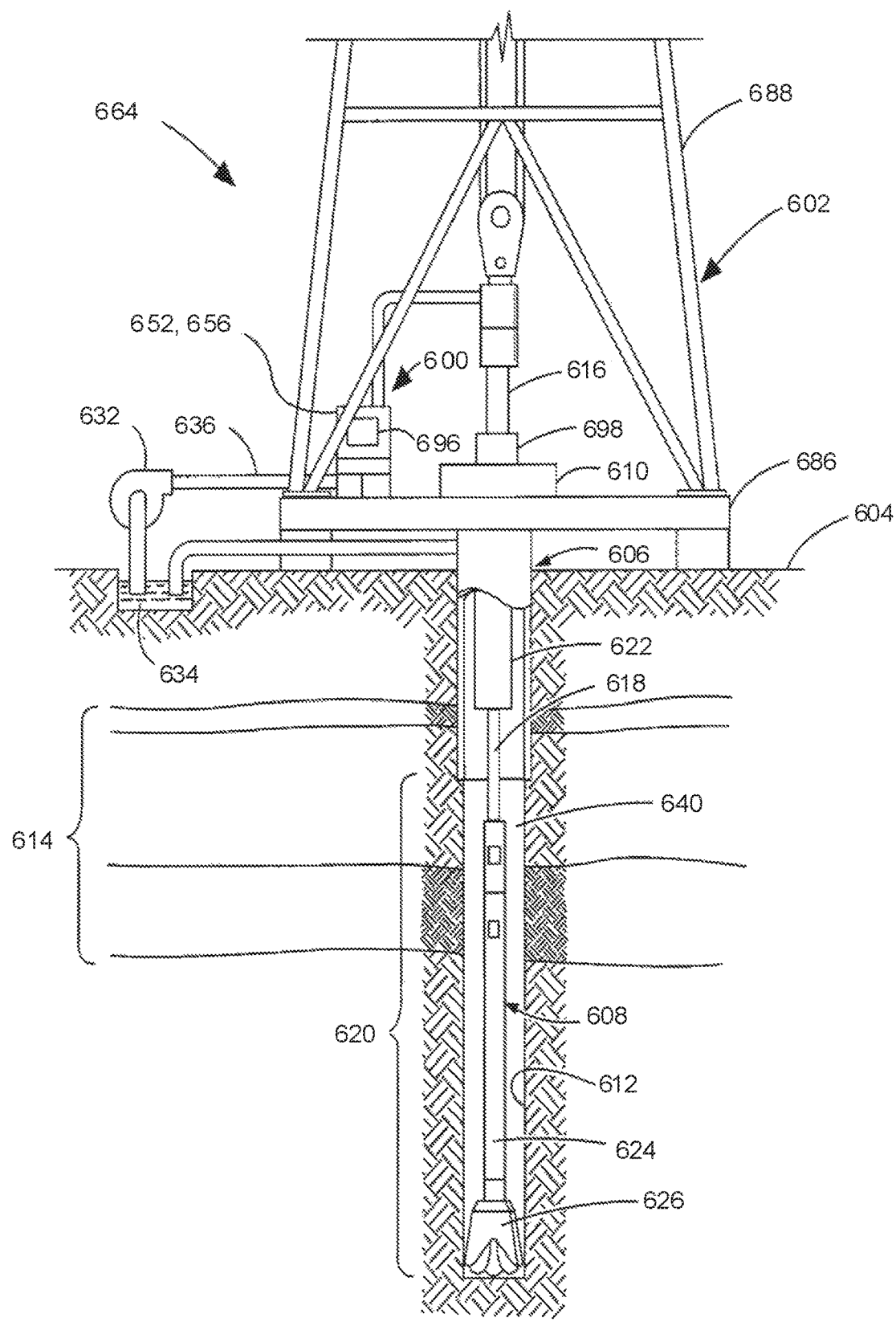
FIG. 6 is a schematic diagram of a drilling rig system, according to some embodiments.

FIG. 6 is a schematic diagram of a drilling rig system, according to some embodiments. For example, in FIG. 6 it can be seen how a system 664 may also form a portion of a drilling rig 602 located at the surface 604 of a well 606. Drilling of oil and gas wells is commonly carried out using a string of drill pipes connected together so as to form a drilling string 608 that is lowered through a rotary table 610 into a wellbore or borehole 612. Here a drilling platform 686 is equipped with a derrick 688 that supports a hoist.

The drilling rig 602 may thus provide support for the drill string 608. The drill string 608 may operate to penetrate the rotary table 610 for drilling the borehole 612 through subsurface formations 614. The drill string 608 may include a Kelly 616, drill pipe 618, and a bottom hole assembly 620, perhaps located at the lower portion of the drill pipe 618.

The bottom hole assembly 620 may include drill collars 622, a down hole tool 624, and a drill bit 626. The drill bit 626 may operate to create a borehole 612 by penetrating the surface 604 and subsurface formations 614. The down hole tool 624 may comprise any of a number of different types of tools including MWD tools, LWD tools, and others.

During drilling operations, the drill string 608 (perhaps including the Kelly 616, the drill pipe 618, and the bottom hole assembly 620) may be rotated by the rotary table 610. In addition to, or alternatively, the bottom hole assembly 620 may also be rotated by a motor (e.g., a mud motor) that is located down hole. The drill collars 622 may be used to add weight to the drill bit 626. The drill collars 622 may also operate to stiffen the bottom hole assembly 620, allowing the bottom hole assembly 620 to transfer the added weight to the drill bit 626, and in turn, to assist the drill bit 626 in penetrating the surface 604 and subsurface formations 614.

During drilling operations, a mud pump 632 may pump drilling mud from a mud pit 634 through a hose 636 into the drill pipe 618 and down to the drill bit 626. The drilling mud can flow out from the drill bit 626 and be returned to the surface 604 through an annular area 640 between the drill pipe 618 and the sides of the borehole 612. The drilling mud may then be returned to the mud pit 634, where such fluid is filtered. In some embodiments, the drilling mud can be used to cool the drill bit 626, as well as to provide lubrication for the drill bit 626 during drilling operations. Additionally, the drilling mud may be used to remove subsurface formation 614 cuttings created by operating the drill bit 626. It is the images of these cuttings that many embodiments operate to acquire and process.

Thus, referring now to FIG. 1, it may be seen that in some embodiments, a system 664 may comprise a shaker 104 and shaker power monitor 181 to receive and separate drilling mud and solids from downhole, as described previously. The system 664 may be configured to have a field of view that includes the drilling mud screen 108, wherein the system 664 includes one or more imaging devices 124 and one or more processors 130, operating as described previously.

It should also be understood that the apparatus and systems of various embodiments can be used in applications other than for pumping arid drilling operations, and thus, various embodiments are not to be so limited. The illustrations of system 100 and systems 664 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

A communication cable and possible power cable can be run from nearest point of power and data acquisition point. The data acquisition device can be a computer of some other device with the capability to interpret or transmit the pictures to a software program. The software program may or may not have to be calibrated using objects with a known volume that may or may not be of different shapes. The calibration could occur on the shakers themselves or on another flat surface with the same focal length.

Example Operations

Figure 7:
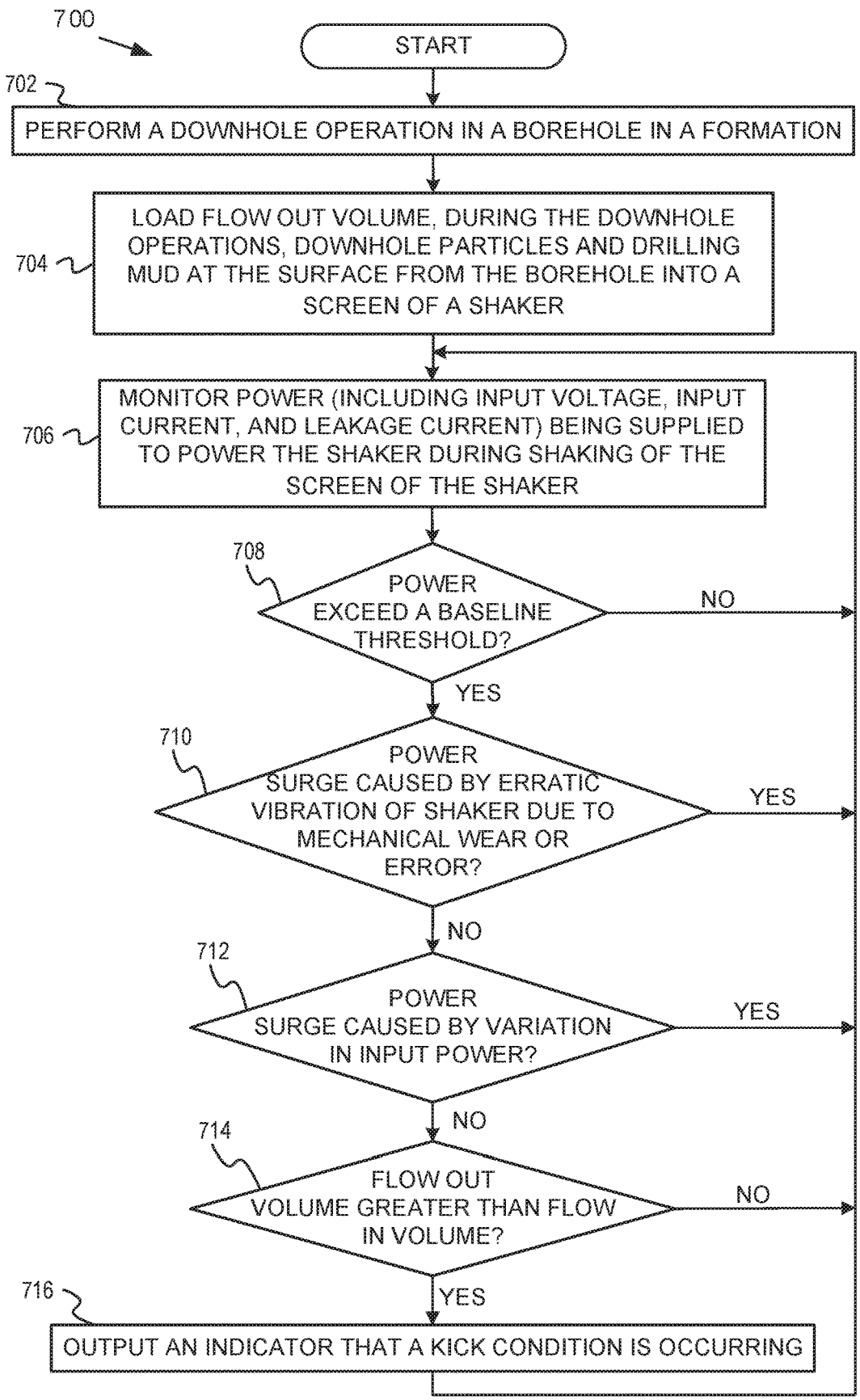
FIG. 7 is a flowchart of operations for performing kick detection based on power monitoring of a shaker, according to some embodiments.

Example operations of performing kick detection is now described. FIG. 7 is a flowchart of operations for performing kick detection based on power monitoring of a shaker, according to some embodiments. Operations of a flowchart 700 can be performed by software, firmware, hardware or a combination thereof. Operations of the flowchart 700 are described in reference to a single shaker. However, such operations can be performed across multiple shakers in which the total power across motors of multiple shakers is compared to a baseline threshold. The operations of the flowchart 700 start at block 702.

At block 702, a downhole operation is performed in a borehole in a formation. For example, with reference to FIG. 6, a downhole operation can be drilling operations in which drilling mud is moved downhole to remove downhole particles (e.g., cuttings) that are returned to the surface. Shaker(s) can then separate the drilling mud from the cuttings.

At block 704, downhole particles and the drilling mud are loaded into a shaker screen of a shaker. For example, with reference to FIG. 1, the cuttings 112 and drilling mud which returned to the surface 166 are placed into the drilling mud screen 108 of the shaker 104.

At block 706, power being supplied to power the shaker during shaking of the screen of the shaker is monitored. The power being supplied can be a three-phase power. Monitoring of three-phase power can include a current for each phase, a voltage for each phase, and the leakage current. For example, with reference to FIG. 2, the data acquisition system 210 receives the current from each of the three phases at inputs I1-I3 and receives the voltage from each of the three phases at inputs V1-V3. The data acquisition system 210 receives the leakage current across each of the three phases via the conductor 226. The data acquisition system 210 can divide a value of the total leakage current by three to apportion the leakage to each of the three phases. The data acquisition system 210 can then subtract the divided value of the total leakage current from the values of the current for each of the three phases (I1-I3) to generate an adjusted current value for each of the three phases. The data acquisition system 210 can then multiply a value of the voltage for the first phase by the adjusted value of the current for the first phase to generate a value of a power for the first phase. The data acquisition system 210 can also multiply a value of the voltage for the second phase by the adjusted value of the current for the second phase to generate a value of a power for the second phase. The data acquisition system 210 can also multiply a value of the voltage for the third phase by the adjusted value of the current for the third phase to generate a value of a power for the third phase. The data acquisition system 210 can then add the three values of power for the first, second, and third phases to generate a total power value being supplied to the motor(s) for the shaker.

At block 708, a determination is made of whether the total power value being supplied to the motor(s) for the shaker exceeds a baseline threshold. A baseline threshold can be determined by monitoring operations of the shaker during what can be considered normal load operations of the shaker. For example, normal operations can be defined in terms of the drilling mud flow, along with cuttings returned to the surface per unit of time. A baseline threshold value for the total power being supplied to the shaker can be determined during normal operations. A baseline threshold value can be a value greater than power usage during normal operations or some percentage beyond power usage over during normal operations (e.g., 5%, 10%, etc.). For instance, with reference to FIGS. 2-4, a computer or device coupled to the remote I/O devices 214-414 may determine the baseline threshold based on power consumption measured over a determined unit of time. As an example, the processor(s) 130 of the workstation 156 may retrieve from memory 150 the power consumption data communicated from the remote I/O device 214 to determine a baseline threshold after monitoring power consumption for a unit of time. The processor(s) 130 can further determine whether or not current power consumption exceeds the baseline threshold. If the total power value does not exceed the baseline threshold, operations of the flowchart 700 return to block 706 to again monitor the power being used by the shaker. Otherwise, operations of the flowchart 700 continue at block 710.

At block 710, a determination is made of whether the change in power is caused by erratic vibration of the shaker. This erratic vibration can be caused by some type of mechanical wear or error. For example, with reference to FIG. 5, a computer or device coupled to the remote I/O device 518 can make the determination. An example of determining whether the power surge is caused by erratic shaker vibration is described above in the description of FIG. 5. If the power surge is caused by erratic shaker vibration, it can be assumed that the power surge is not caused by a kick condition occurring downhole. Accordingly, in this situation, operations of the flowchart 700 return to block 706 to again monitor the power being used by the shaker. If the power surge is not caused by erratic vibration of the shaker, operations of the flowchart 700 continue at block 712.

At block 712, a determination is made whether the change in power is caused by a variation in input power. A power feed monitoring system captures the live power supplied to the shaker. Any power fluctuations in the power supply (i.e., power supplied to the rig power supply 182) are captured. Fluctuations are analyzed to identify whether the differences between changes in the power feed are due to a total fluid load change or changes in power feed (e.g., due to dirty rig power). Changes in input power quality and the increases in input power supplied to the shaker can be differentiated to establish direct correlation between total fluid load change and power feed changes. Additionally, leakage current can be captured and analyzed to determine if an increase or change in leakage current affects the input power. Increases in leakage current which substantially deviate during the leakage current captured during normal operation of the shaker can result in an increase in input power supplied to the shaker. For example, with reference to FIGS. 2-4, the data acquisition systems 210-410 capture the leakage current. After communicating the measured leakage current to a computer or device coupled to the remote I/O devices 214-414, such as the workstation 156, the leakage current measurement may be stored in memory 150. The processor(s) 130 may compare the measured leakage current with trends in captured leakage current which were observed and stored in memory 150. Detection of a substantial increase in leakage current (e.g., a 5% increase in leakage current) prompts determination that the fluctuation in input power is a result of varied input power due to the increase in the leakage current. If the power fluctuation is caused by a variation in input power, operations of the flowchart 700 return to block 706 to monitor the power used by the shaker. If the power surge is not caused by variation in input power, operations of the flowchart 700 continue at block 714.

At block 714, a determination is made if a flow out volume is greater than a flow in volume. Once the data has been obtained or recorded for total power consumption on all the shakers that are running, the data can be analyzed to identify a kick condition. For example, with reference to FIGS. 1 and 2, the processor(s) 130 may perform the analysis based on the data stored in memory 150 during operation of the shaker 104 during a downhole operation. The total load of fluid and/or cuttings ("flow out volume") on the shaker 104 will be compared to the flow in volume. The flow in volume can be obtained by multiplying the pump strokes and volume per stroke on the rig pumps or by putting a flowmeter after the pumps. Drilling parameters including the pump strokes and volume per stroke may also be stored in and acquired from memory 150. If the flow out volume is greater than the flow in volume, a kick condition can be identified.

At block 716, an indicator that a kick condition is occurring downhole is output. With reference to FIGS. 1 and 2 above, the data acquisition system 210 can output an indication of a kick condition to the data acquisition system 152 for storage in the database 134, displayed on the display 196, etc. Operations of the flowchart 700 continue at 706 to again monitor the power being used by the shaker. Operations of performing downhole operations at block 702 and loading the downhole particles and drilling mud into a screen of the shaker can also continue.

Example Computer

Figure 8:
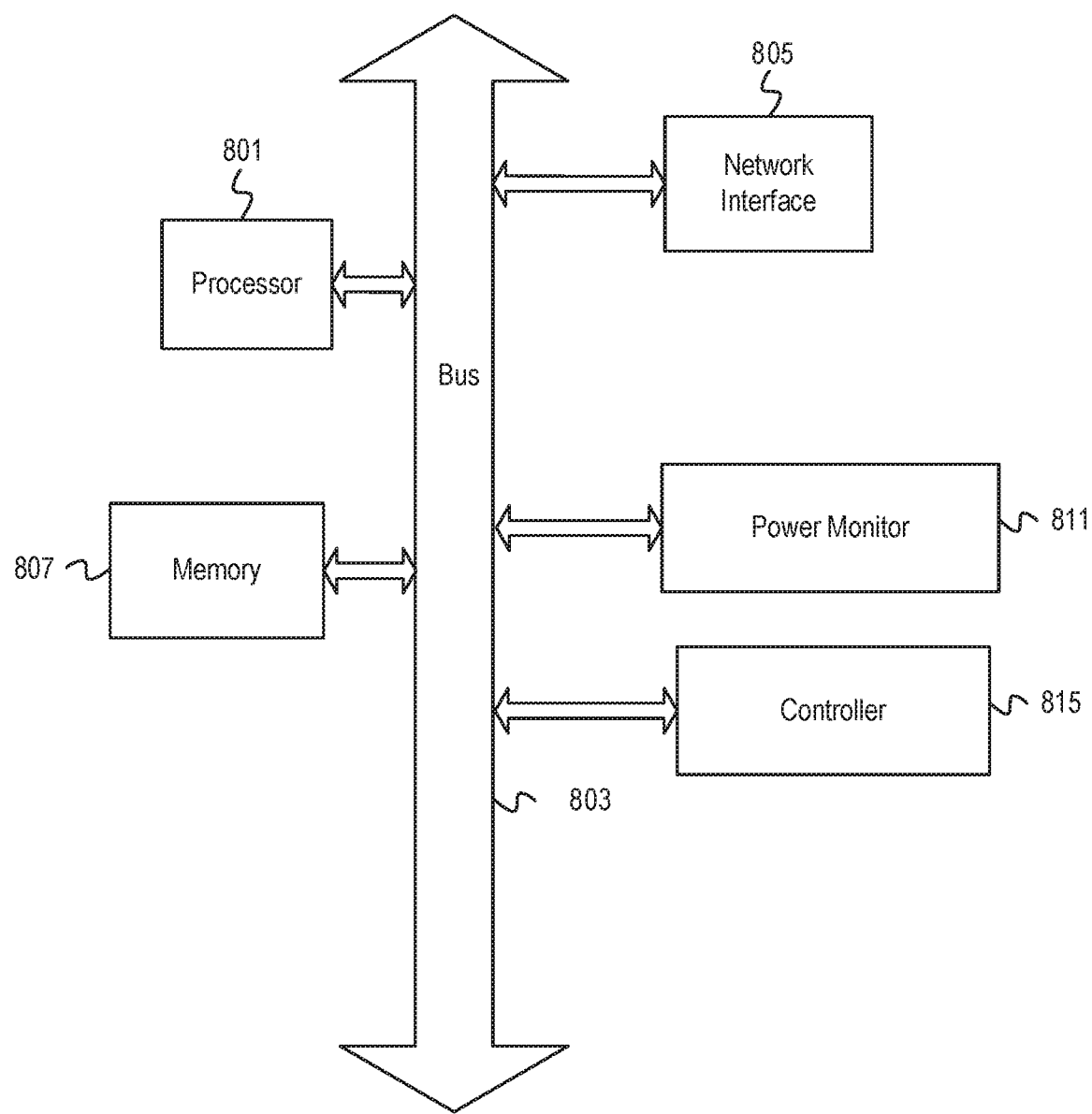
FIG. 8 is an example computer, according to some embodiments.

FIG. 8 depicts an example computer, according to some embodiments. The computer includes a processor 801 (possibly including multiple processors, multiple cores, multiple nodes, and/or implementing multi-threading, etc.). The computer includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an interact small computer system interface, SONET interface, wireless interface, etc.).

The computer also includes a power monitor 811 and a controller 815. The power monitor 811 can monitor the power usage of the shaker(s) as described above. The controller 815 can control the different operations that can occur in the response to the power monitoring. For example, the controller 815 can communicate instructions to the appropriate equipment, devices, etc. to alter the drilling operations. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While depicted as a computer, some embodiments can be any type of device or apparatus to perform operations described herein.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Using the apparatus, systems, and methods disclosed herein may provide the ability to monitor changes in down hole particles (e.g., cuttings), so that the impact of drilling fluid properties and activities in the field can be assessed immediately. This ability may be used to increase efficiency by redirecting pumping and drilling operations in real-time, perhaps as part of a closed-loop control system.

While the aspects of the disclosure are described with reference to various implementations and exploitations, it will be understood that these aspects are illustrative and that the scope of the claims is not limited to them. In general, techniques for processing and analyzing of particles from downhole as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: A method comprising: performing a downhole operation in a borehole in a formation; capturing, during the downhole operation, downhole particles and drilling mud at a surface from the borehole into a screen of a shaker; monitoring input power that comprises at least one of voltage, current, and leakage current being supplied to the shaker during operation of the shaker; determining whether the input power exceeds a threshold as a result of change in a load on the shaker; and in response to determining that the input power exceeds the threshold as the result of change in the load on the shaker, determining that there is a kick condition in the borehole.

Embodiment 2: The method of Embodiment 1, wherein the kick condition comprises a condition wherein a pressure of the formation exceeds a pressure in the borehole.

Embodiment 3: The method of Embodiment 1 or 2 further comprising: determining whether the input power exceeds the threshold as a result of a variation in the input power supplied to the shaker; and in response to determining that the input power exceeds the threshold as a result the variation in the input power supplied to the shaker.

Embodiment 4: The method of any one of Embodiments 1-3 further comprising: determining whether the input power exceeds the threshold as a result of an increase in a vibration of the shaker; and in response to determining that the input power exceeds the threshold as a result of the increase in the vibration of the shaker, continuing to monitor the input power without determining that there is a kick condition in the borehole.

Embodiment 5: The method of any one of Embodiments 1-4 further comprising: determining whether the input power exceeds the threshold as a result of a leakage current; and in response to determining that the input power exceeds the threshold as a result the leakage current, continuing to monitor the input power without determining that there is a kick condition in the borehole.

Embodiment 6: The method of any one of Embodiments 1-5, wherein determining whether the input power exceeds the threshold comprises determining whether the load on the shaker is greater than a volume of downhole particles and drilling mud flowing into the shaker.

Embodiment 7: The method of any one of Embodiments 1-6 further comprising, in response to determining that the input power exceeds the threshold as the result of change in the load on the shaker, outputting an indication of a kick condition in the borehole.

Embodiment 8: One or more non-transitory machine-readable media comprising program code executable by a processor to cause a device to perform operations comprising: performing a downhole operation in a borehole in a formation; capturing, during the downhole operation, downhole particles and drilling mud at a surface from the borehole into a screen of a shaker; monitoring input power that comprises at least one of voltage, current, and leakage current being supplied to the shaker during operation of the shaker; determining whether the input power exceeds a threshold as a result of change in a load on the shaker; and in response to determining that the input power exceeds the threshold as the result of change in the load on the shaker, determining that there is a kick condition in the borehole.

Embodiment 9: The non-transitory machine-readable media of Embodiment 8, wherein the kick condition comprises a condition wherein a pressure of the formation exceeds a pressure in the borehole.

Embodiment 10: The non-transitory machine-readable media of Embodiment 8 or 9, further comprising program code executable by a processor to cause a device to perform operations comprising: determining whether the input power exceeds the threshold as a result of a variation in the input power supplied to the shaker; and in response to determining that the input power exceeds the threshold as a result the variation in the input power supplied to the shaker, continuing to monitor the input power without determining that there is a kick condition in the borehole.

Embodiment 11: The non-transitory machine-readable media of any one of Embodiments 8-10, further comprising program code executable by a processor to cause a device to perform operations comprising: determining whether the input power exceeds the threshold as a result of an increase in a vibration of the shaker; and in response to determining that the input power exceeds the threshold as a result of the increase in the vibration of the shaker, continuing to monitor the input power without determining that there is a kick condition in the borehole.

Embodiment 12: The non-transitory machine-readable media of any one of Embodiments 8-11, further comprising program code executable by a processor to cause a device to perform operations comprising: determining whether the input power exceeds the threshold as a result of a leakage current; and in response to determining that the input power exceeds the threshold as a result the leakage current, continuing to monitor the input power without determining that there is a kick condition in the borehole.

Embodiment 13: The non-transitory machine-readable media of any one of Embodiments 8-12, wherein determining whether the input power exceeds the threshold comprises determining whether the load on the shaker is greater than a volume of downhole particles and drilling mud flowing into the shaker.

Embodiment 14: A system comprising: a shaker comprising a shaker screen onto which downhole particles and fluid from a borehole are placed, the downhole particles a product of a downhole operation; at least a first motor which vibrates the shaker screen to separate the downhole particles from the fluid; a first sensor which monitors input power supplied to the first motor and second motor; and a device to monitor input power that comprises at least one of voltage, current, and leakage current being supplied to the shaker during operation of the shaker, determine whether the input power exceeds a threshold as a result of change in a load on the shaker, and in response to a determination that the input power exceeds the threshold as the result of change in the load on the shaker, determine that there is a kick condition in the borehole.

Embodiment 15: The system of Embodiment 14, wherein the kick condition comprises a condition wherein a pressure of a formation exceeds a pressure in the borehole.

Embodiment 16: The system of Embodiment 14 or 15, wherein the device to determine whether the input power exceeds the threshold comprises the device to determine whether the load on the shaker is greater than a volume of downhole particles and drilling mud flowing into the shaker.

Embodiment 17: The system of any one of Embodiments 14-16, wherein the device is to, in response to a determination that the input power exceeds the threshold as the result of change in the load on the shaker, output an indication of a kick condition in the borehole.

Embodiment 18: The system of any one of Embodiments 14-17, wherein the device is to, determine whether the input power exceeds the threshold as a result of a variation in the input power supplied to the shaker; and in response to a determination that the input power exceeds the threshold as a result the variation in the input power supplied to the shaker, continue to monitor the input power without determining that there is a kick condition in the borehole.

Embodiment 19: The system of any one of Embodiments 14-18, wherein the device is to, determine whether the input power exceeds the threshold as a result of an increase in a vibration of the shaker; and in response to a determination that the input power exceeds the threshold as a result of the increase in the vibration of the shaker, continue to monitor the input power without determining that there is a kick condition in the borehole.

Embodiment 20: The system of any one of Embodiments 14-19, wherein the device is to, determine whether the input power exceeds the threshold as a result of a leakage current; and in response to a determination that the input power exceeds the threshold as a result the leakage current, continue to monitor the input power without determining that there is a kick condition in the borehole.

What is claimed is:

1. A method comprising:
performing a downhole operation in a borehole in a formation;
capturing, during the downhole operation, downhole particles and drilling mud at a surface from the borehole into a screen of a shaker;
monitoring input power that comprises at least one of voltage or current being supplied to the shaker during operation of the shaker;
determining whether the input power exceeds a threshold as a result of change in a load on the shaker and change in a vibration pattern of the shaker;
in response to determining that the input power exceeds the threshold as the result of change in the load on the shaker, determining that there is a kick condition in the borehole; and
in response to determining that the input power exceeds the threshold as a result of the change in the vibration of the shaker, continuing to monitor the input power without determining that there is a kick condition in the borehole.

2. The method of claim 1, wherein the kick condition comprises a condition wherein a pressure of the formation exceeds a pressure in the borehole.

3. The method of claim 1 further comprising:
determining whether the input power exceeds the threshold as a result of a variation in the input power supplied to the shaker; and
in response to determining that the input power exceeds the threshold as a result of the variation in the input power supplied to the shaker, continuing to monitor the input power without determining that there is a kick condition in the borehole.

4. The method of claim 1 further comprising:
monitoring the input power being supplied to the shaker during operation of the shaker for a leakage current;
determining whether the input power exceeds the threshold as a result of the leakage current; and
in response to determining that the input power exceeds the threshold as a result of the leakage current, continuing to monitor the input power without determining that there is a kick condition in the borehole.

5. The method of claim 1, wherein determining whether the input power exceeds the threshold comprises determining whether the load on the shaker is greater than a volume of downhole particles and drilling mud flowing into the shaker.

6. The method of claim 1, further comprising:
in response to determining that the input power exceeds the threshold as the result of change in the load on the shaker, outputting an indication of a kick condition in the borehole.

7. One or more non-transitory machine-readable media comprising program code executable by a processor to cause a device to perform operations comprising:
performing a downhole operation in a borehole in a formation;
capturing, during the downhole operation, downhole particles and drilling mud at a surface from the borehole into a screen of a shaker;

monitoring input power that comprises at least one of voltage or current being supplied to the shaker during operation of the shaker;

determining whether the input power exceeds a threshold as a result of change in a load on the shaker and change in a vibration pattern of the shaker;

in response to determining that the input power exceeds the threshold as the result of change in the load on the shaker, determining that there is a kick condition in the borehole; and in response to determining that the input power exceeds the threshold as a result of the change in the vibration pattern of the shaker, continuing to monitor the input power without determining that there is a kick condition in the borehole.

8. The non-transitory machine-readable media of claim 7, wherein the kick condition comprises a condition wherein a pressure of the formation exceeds a pressure in the borehole.

9. The non-transitory machine-readable media of claim 7, further comprising program code executable by the processor to cause the device to perform operations comprising:

determining whether the input power exceeds the threshold as a result of a variation in the input power supplied to the shaker; and in response to determining that the input power exceeds the threshold as a result of the variation in the input power supplied to the shaker, continuing to monitor the input power without determining that there is a kick condition in the borehole.

10. The non-transitory machine-readable media of claim 7, further comprising program code executable by the processor to cause the device to perform operations comprising:

monitoring the input power being supplied to the shaker during operation of the shaker for a leakage current;

determining whether the input power exceeds the threshold as a result of the leakage current; and in response to determining that the input power exceeds the threshold as a result the leakage current, continuing to monitor the input power without determining that there is a kick condition in the borehole.

11. The non-transitory machine-readable media of claim 7, wherein determining whether the input power exceeds the threshold comprises determining whether the load on the shaker is greater than a volume of downhole particles and drilling mud flowing into the shaker.

12. A system comprising:

a shaker comprising a shaker screen onto which downhole particles and fluid from a borehole are placed, the downhole particles a product of a downhole operation;

at least a first motor which vibrates the shaker screen to separate the downhole particles from the fluid;

a first sensor which monitors input power supplied to the at least the first motor; and a device to, monitor input power that comprises at least one of voltage or current being supplied to the shaker during operation of the shaker;

determine whether the input power exceeds a threshold as a result of change in a load on the shaker and change in a vibration pattern of the shaker;

in response to a determination that the input power exceeds the threshold as the result of change in the load on the shaker, determine that there is a kick condition in the borehole; and in response to determining that the input power exceeds the threshold as a result of the change in the vibration pattern of the shaker, continuing to monitor the input power without determining that there is a kick condition in the borehole.

13. The system of claim 12, wherein the kick condition comprises a condition wherein a pressure of a formation exceeds a pressure in the borehole.

14. The system of claim 12, wherein the device to determine whether the input power exceeds the threshold comprises the device to determine whether the load on the shaker is greater than a volume of downhole particles and drilling mud flowing into the shaker.

15. The system of claim 12, wherein the device is to, in response to a determination that the input power exceeds the threshold as the result of change in the load on the shaker, output an indication of a kick condition in the borehole.

16. The system of claim 12, wherein the device is to, determine whether the input power exceeds the threshold as a result of a variation in the input power supplied to the shaker; and in response to a determination that the input power exceeds the threshold as a result the variation in the input power supplied to the shaker, continue to monitor the input power without determining that there is a kick condition in the borehole.

17. The system of claim 12, wherein the device is to, monitor the input power being supplied to the shaker during operation of the shaker for a leakage current;

determine whether the input power exceeds the threshold as a result of the leakage current; and in response to a determination that the input power exceeds the threshold as a result of the leakage current, continue to monitor the input power without determining that there is a kick condition in the borehole.

* * * * *